TEMPORARY INFORMATION STORAGE FOR HIGH SPEED PRINTERS

Filed April 28, 1961 3 Sheets-Sheet 1

INVENTOR.
GEORGE T. SHIMABUKURO
BY
Christie, Parker & Hale
ATTORNEYS.

INVENTOR.
GEORGE T. SHIMABUKURO
BY
Christie, Parker & Hale
ATTORNEYS.

TEMPORARY INFORMATION STORAGE FOR HIGH SPEED PRINTERS

Filed April 28, 1961 3 Sheets-Sheet 3

INVENTOR.
GEORGE T. SHIMABUKURO
BY Christie, Parker & Hale
ATTORNEYS.

United States Patent Office 3,088,401

Patented May 7, 1963

3,088,401
TEMPORARY INFORMATION STORAGE FOR HIGH SPEED PRINTERS

George T. Shimabukuro, Los Angeles, Calif., assignor to Burroughs Corporation, Detroit, Mich., a corporation of Michigan Filed Apr. 28, 1961, Ser. No. 106,346
8 Claims. (Cl. 101—93)

This invention relates to a novel apparatus for selectively exciting particular print hammers of a high speed printer in response to print information temporarily stored therein.

In high speed printers which print information in lines across a print medium it is common that like characters in a line of information be printed simultaneously and that this operation be repeated for each character to be printed in the line prior to the printing of another line of information. To accomplish this such high speed printers include a moving type surface having type characters disposed thereon in a row-column array—like type characters being arranged in rows across the type surface. Positioned above the type surface, these high speed printers include a plurality of print hammers, one positioned above each type column of the type surface. To then simultaneously print all like characters in a line of information on a print medium passing between the type surface and the print hammers particular ones of the plurality of print hammers are simultaneously actuated in response to print information stored within the printer.

In the past circuits for storing print information in high speed printers have generally included a capacitive storage arrangement. Initially, in such prior art arrangements, all capacitors of the print information store are charged to a known potential. When it is desired to excite a particular print hammer, a trigger circuit associated with a given capacitor, usually a thyratron, is selectively energized through a gating circuit, such as a diode matrix gating arrangement. When the thyratron is energized, the particular capacitor is rapidly discharged through the coil of an associated print hammer to actuate the print hammer causing it to print.

Due to the discharge time of the capacitor, such prior art storage arrangements possess an inherent speed limitation.

Further, since the capacitor is normally charged to a known potential, changes in the charging potential as well as aging of the capacitor and thyratron elements affect the timing of the storage device in actuating the print hammers.

Still further, the prior art storage arrangement, due to its use of active elements, requires a large number of passive elements, such as biasing resistors and diodes. Accordingly, the prior art capacitive storage arrangement utilizes an appreciable amount of space and involves a considerable expense to provide selective excitation of the print hammers of a high speed printer.

In view of the above, the present invention provides an inexpensive, solid-state arrangement having a minimum of components for temporarily storing print information and for selectively exciting print hammers of a high speed printer in response to the print information temporarily stored therein.

To accomplish this, the present invention in a basic form includes a plurality of magnetic cores which have a substantially rectangular hysteresis characteristic. These cores are arranged in a row-column array such that a magnetic core is associated with each print hammer of the associated high speed printer. In particular, each magnetic core includes an output winding coupled through a unidirectional current conductive device to its associated print hammer.

To store print information in the storage arrangement of the present invention, which is indicative of the print hammers to be actuated, particular row and column conductors of the core array are simultaneously energized, the magnetic cores common to an energized row and column conductor being "set" to a predetermined flux state.

To excite the particular print hammers which correspond to the print information stored in the magnetic core array, a reset conductor which passes in a like direction through all magnetic cores is energized. This "resets" all magnetic cores and produces an output signal in the output winding of those cores which were previously set to temporarily store print information. In response to these output signals, print hammers corresponding to the print information stored in the core array are actuated.

In a preferred form of the present invention, the core array includes means for checking print operation of the print hammers in response to the information stored in the cone array.

In particular, the print checking arrangement includes a second magnetic core associated with each core of the aforementioned row-column array, the cores of the aforementioned core array being termed the "primary" cores, and the second cores being termed the "secondary" cores of a core pair. The secondary cores are arranged to be "set" with the primary cores and "reset" by an actuation of the print hammers associated with the primary cores. To check the actuation of the print hammers, the checking arrangement includes means for passing a current through each of the secondary cores subsequent to the actuation of the hammers to "reset" any "set" secondary cores and produce an output signal in response to the reset. Since the previously "set" secondary cores are to be "reset" in response to an actuation of their associated print hammers, if, for some reason a hammer is not actuated, the secondary core associated therewith remains in a "set" condition. Thus, an output signal produced in response to the application of the secondary reset current is indicative of a printing error, in that at at least one of the previously "set" secondary cores has not been "reset." This output signal may then be utilized to actuate error indicating means such as an auxiliary print hammer.

Although the storage arrangement of the present invention has been briefly described above a more complete understanding thereof may be had by reference to the following detailed description when considered with the drawings, in which.

Figure 1:
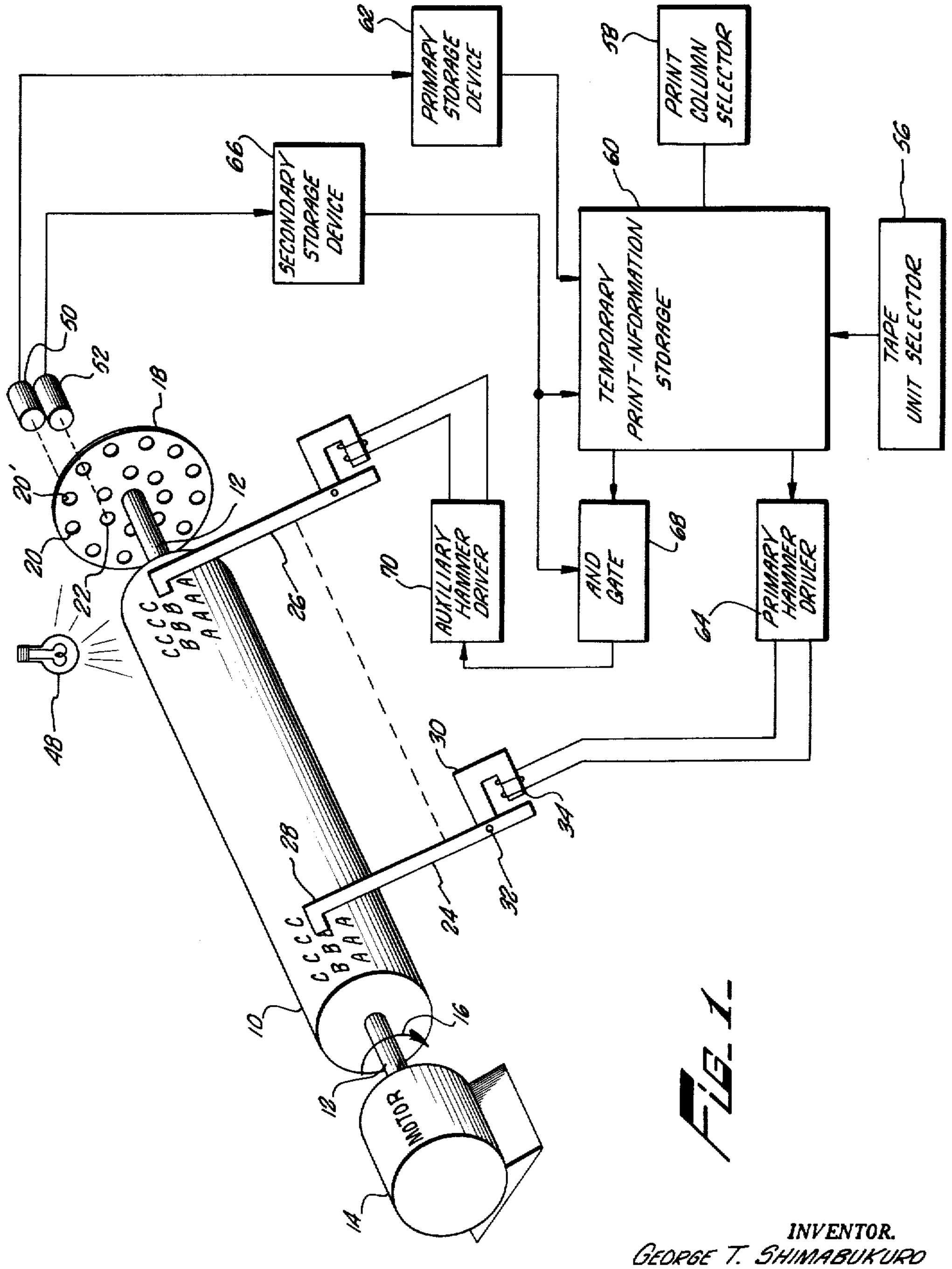
FIGURE 1 is a schematic-block diagram representation of a high speed printer in which the present invention may be utilized.

Referring to FIGURE 1, there is illustrated a high speed printer in which the present invention may be utilized. As represented, the high speed printer includes a rotating type drum 10 mounted for rotation about a drive shaft 12. One end of the drive shaft 12 is coupled to a motor 14 which drives the drive shaft and the type drum at a high speed in a clockwise direction as indicated by the arrow 16.

As represented in FIGURE 1, the other end of the drive shaft 12 is coupled to a code disc 18. The code disc 18, as illustrated, includes a first plurality of holes represented at 20 which are spaced evenly near the periphery of the disc 18. In particular, the spacing of the holes 20 corresponds to the spacing of the type characters disposed upon the surface of the type drum 10. Thus the spacing between the holes 20 and 20' corresponds to the spacing between the letters B and C on the type drum 10. As is further illustrated, the code disc 18 includes a second plurality of holes represented at 22. The holes 22 are disposed midway between each of the holes 20 and, as will be described in detail later, are utilized in the error checking arrangement of the present invention.

As previously indicated, the type drum 10 includes type characters disposed upon its surface. By way of example only, the type characters are represented as being the letters of the alphabet. As represented, the type characters are arranged in a row-column array on the type drum 10. In particular, like letters are arranged in a row along the length of the type drum while each column of letters includes all letters of the alphabet arranged in a ring around the type drum.

To print in the high speed printer illustrated in FIGURE 1, a plurality of print hammers are included, two of which are represented at 24 and 26, respectively. In particular, a print hammer is aligned with each type column of the type drum 10. As illustrated, the print hammer 24 includes a print arm 28 and an actuating means 30, the print arm 28 being hinged to the actuating means 30 at a hinge point 32. In particular, the actuating means 30 is represented as including an electromagnet arrangement having a winding 34 which, when energized by a current passing therethrough, attracts one end of the print arm 28, causing the other end to momentarily impinge upon the type drum 10.

Figure 2:
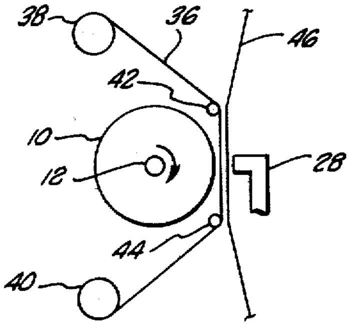
FIGURE 2 is a diagrammatic representation of a side view of a type drum-print hammer configuration such as that represented in FIGURE 1.

To print in response to an actuation of the print hammers, a ribbon-paper arrangement is positioned between the surface of the type drum 10 and the print arm 28 of each of the print hammers. Such an arrangement is represented in FIGURE 2. As illustrated, a ribbon 36 secured at spools 38 and 40 and passing over guides represented at 42 and 44 is positioned above the surface of the type drum 10. Further, as represented, a printing medium 46, such as a roll of paper, is positioned between the ribbon 36 and the print arm 28. Thus, when the print arm 28 is actuated and forced toward the type drum 10, it impinges upon the printing medium 46 causing it to press against the ribbon 36 and the type character positioned at that instant of time under the print arm 28, thereby printing a letter on the printing medium 46.

Although not specifically shown in FIGURE 1, the printing medium 46 may take the form of a plurality of print tapes positioned adjacent to each other above the surface of the type drum 10. Such a printing medium arrangement is commonly included in the type of high speed printer known as a "lister." In a lister, each print tape includes a plurality of print columns, each associated with a type column of the type drum 10. In this arrangement, a plurality of print hammers, one positioned above each print column, is associated with each print tape. Thus, by selectively actuating print hammers, information may be simultaneously printed upon each of the print tapes.

To selectively energize the print hammers, it is necessary to know at all times the rotational position of the type drum 10, thereby determining which particular type character is at any instant of time located beneath the print arm 28. To provide such information, the aforementioned code disc 18 is utilized. As previously indicated, the holes 20 are spaced in an ordered arrangement corresponding to the spacing of the type characters in each print column of the type drum 10. Thus, by positioning a light source represented at 48 and a photocell arrangement, including photocells 50 and 52, on opposite sides of the code disc 18 and by aligning these photocells to receive light from the light source 48 through the holes 20 and 22, respectively, for each type character passing beneath a print arm 28, light passes through a hole 20 to photocell 50. The rotational position of the type drum 10 being determined by the excitation of the photocell 50 may then be utilized by apparatus (not shown) to accurately time the application of print information to a print information storage of the printer.

Generally, the print information is developed by a data processor with which the printer is associated. When a lister type of printer is employed, information indicative of the particular tapes to be printed is generated at a tape unit selector represented at 56. Further, information representing the particular print columns of each print tape to be printed is generated at a print column selector represented at 58. For example, the particular indicia to be printed may be a "B." Thus, at a time just preceding the passing of a "B" under all of the print hammers, the print information generated in the tape unit selector 56 and in the print column selector 58 is transmitted into a temporary print-information storage represented at 60. As will be more completely described in connection with FIGURE 3, the print information applied to the storage 60 of the present invention energizes particular sectors or compartments of the storage 60. When the letter "B" is nearly beneath the print hammer, the cell 50 generates an output signal. The output signal in turn actuates a primary storage driver 62 which generates a current signal causing the information stored within the storage 60 to excite means for actuating particular print hammers associated with the energized sectors or compartments of the storage 60. One of such means is represented at 64 as a primary hammer-driver to actuate the print hammer 24 and may take the form of a blocking oscillator.

The particular hammers corresponding to the print information having printed all "B's," the data processor stores print information within the storage 60 indicative of particular print hammers to be energized to print "C's" in the print columns of the print tapes. This information storage takes place in an increment of time less than that required for the type drum to rotate the "C's" beneath the print hammers. When the "C's" are nearly beneath the print hammers the cell 50 is again energized to cause the information indicative of the printing of "C's" stored within the storage 60 to actuate particular print hammers.

This operation is repeated for all letters of the alphabet at which time means (not shown) are actuated to shift the position of the print tapes, thereby allowing the print operation to be repeated for a new row on each print tape.

As is further represented in FIGURE 1, the temporary print information storage 60 of the present invention includes means for checking the print operation of the print hammers. The structure and operation of this print-checking arrangement will be completely described in connection with FIGURE 4. However, for the present discussion it will suffice to state that the arrangement is energized in response to signals generated by the photocell 52. In particular, as previously mentioned, the holes 22 in the code wheel 18 are spaced between the holes 20. Further, the cell 52 is positioned such that it receives light from the light source 48 when a hole 22 is in line with the light source 48. Due to the positioning of the holes 22, the cell 52 is energized when the printing end of the print arm 28 of the print hammers is midway between two letters, such as "B" and "C." The energizing of the photocell 52 actuates a secondary storage driver represented at 66 to produce a current signal which reactuates the compartments of the storage 60 which were previously energized in response to the print information generated by the data processor. As will be described in detail in connection with FIGURE 4, if a print hammer has not been actuated in response to the information previously stored within a particular compartment, an output signal is produced in response to the current signal generated by the secondary storage driver 66. Upon coincidence of this output signal and the current signal produced by the driver 66, an "and" gate 68 is operated to pass a current signal to an auxiliary hammer driver represented at 70. As indicated, the auxiliary hammer driver 70 is connected to the winding of the print hammer 26. Thus when the auxiliary hammer driver 70 is energized in response to an operation of the "and" gate 68, the print hammer 26 is caused to print a letter corresponding to the particular letter which was not printed by a one of the print hammers, thereby indicating the particular printing error.

The above general description of the operation of a high speed printer utilizing the features of the present invention points out the necessity of utilizing a print-information storage which reacts rapidly to store print information as well as to excite particular print hammers in response to the print information stored therein. In particular, since it is generally desired in high speed printers to print over sixty thousand different characters per minute, the print information indicative of the printing of a particular type character must be written into the storage and printed in less than one millisecond. A temporary information storage for providing such operation is illustrated in FIGURE 3.

Figure 3:
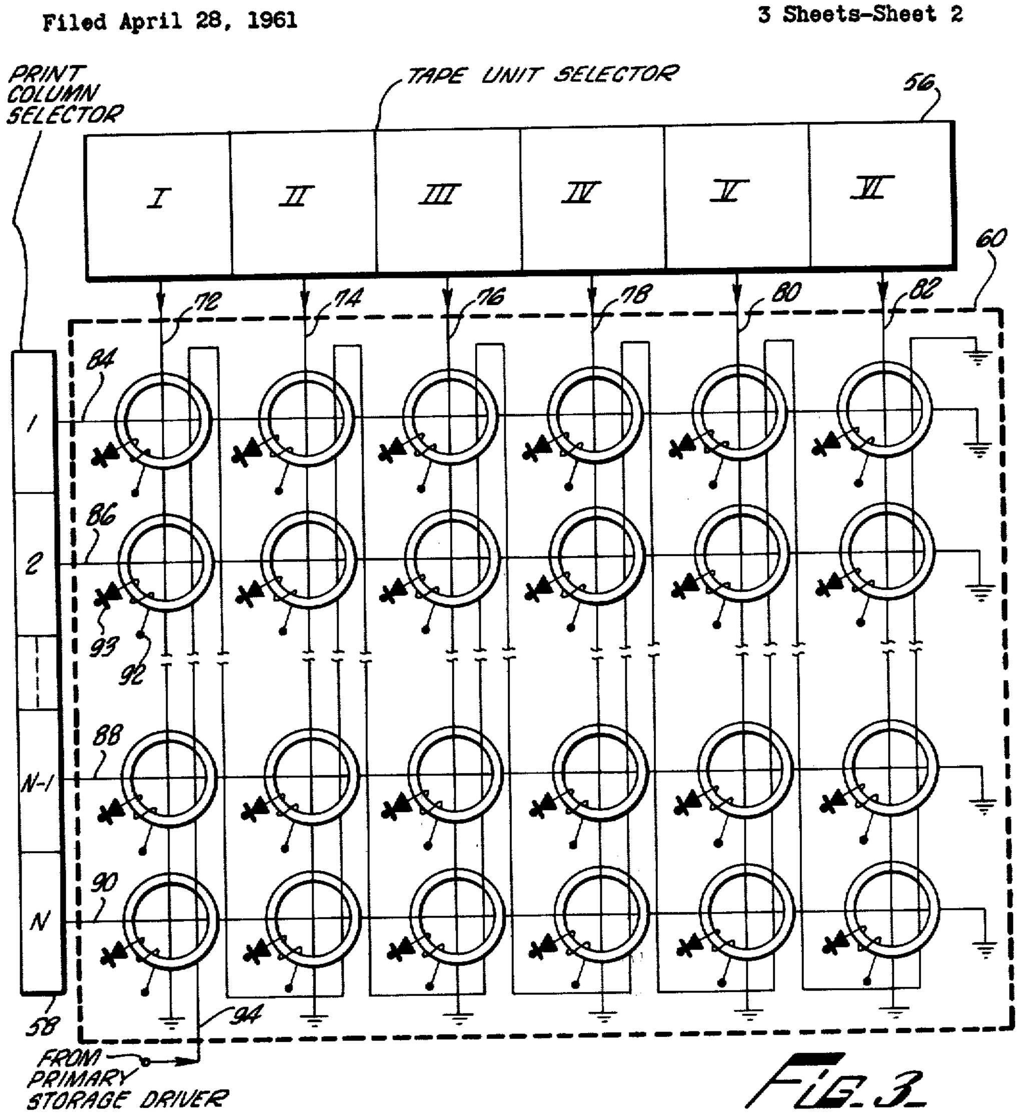
FIGURE 3 is a diagrammatic representation of the magnetic core array of the present invention.

Referring to FIGURE 3, there is illustrated a basic form of the print-information storage of the present invention. As represented, the storage 60 includes a plurality of magnetic cores each having a substantially rectangular hysteresis characteristic. These cores are arranged in a row-column array such that each core is associated with a particular print hammer. Since each core is associated with a print hammer, to temporarily store print information in the core array of the present invention which is indicative of particular print hammers to be actuated, the cores associated with the particular hammers are set to a predetermined flux state.

To provide means for selectively setting particular cores corresponding to the print hammers to be actuated, the core array of the present invention includes a plurality of row and column conductors, the column conductors being represented at 72, 74, 76, 78, 80, and 82, and four of the row conductors being represented at 84, 86, 88, and 90, respectively. As represented, each column conductor is associated with a column of cores; in particular, each column conductor passes through each core of its associated column of cores in a like direction. Further, each row conductor is associated with a row of cores; in particular, each row conductor passes in a like direction through all cores of its associated row.

Due to the rectangular hysteresis characteristic of each core, to selectively set any core, the row and column conductors which pass through the core are energized. In particular, current signals are caused to flow through the particular row and column conductors such that each current "half-writes" the core, a coincidence of the current signals being necessary to set the core to its predetermined flux state. Accordingly, to temporarily store print information indicative of particular print hammers to be excited, particular row and column conductors may be simultaneously energized, the magnetic cores common to an energized row and an energized column conductor being set to a predetermined flux state.

As previously mentioned, each core in the present invention is associated with a particular print hammer. In particular, as illustrated in FIGURE 3, each core has an output winding 92 which is coupled through a unidirectional current conductive device represented by a diode 93 to a hammer driver of the hammer with which it is associated. When a magnetic core is set to a predetermined flux state, a current signal is developed in the output winding of the core. However, due to the diode 93, this current is prohibited from exciting the hammer driver, thereby preventing the associated hammer from being actuated. However, when a previously set core is reset a current signal is developed in the associated output winding which flows in an opposite direction through the series diode to excite the hammer driver thereby actuating the associated hammer. Since in high speed printers of the type in which the present invention may be utilized it is desired to simultaneously actuate particular hammers corresponding to the print information stored in the core array, the present invention includes means for simultaneously resetting all previously set magnetic cores. Accordingly, the print hammers corresponding to the print information stored in the core array of the present invention are simultaneously actuated.

More particularly, to reset all previously set magnetic cores such that the hammers corresponding to the print information stored within the storage 60 are simultaneously actuated, the present invention includes a reset conductor represented at 94. As illustrated, the reset conductor 94 is coupled to the primary storage driver 62 of FIGURE 1 and passes in a like direction through each of the magnetic cores of the storage arrangement 60. Thus, a current signal generated by the storage driver 62 passes through the reset conductor 94 in a direction to cause each of the previously set magnetic cores to be reset. As previously mentioned, this simultaneous reset of the previously set magnetic cores causes an actuation of particular print hammers to selectively print particular print columns designated by the print information stored in storage 60. Since the magnetic cores which are not storing print information are already in a reset state, the application of the reset current from the primary storage driver 62 does not affect their flux state.

Thus, in the present invention, print information indicative of the excitation by particular print hammers is stored in a magnetic core arrangement by a coincident excitation of particular row and column conductors. Further, the simultaneous excitation of the print hammers associated with the set magnetic cores is accomplished by energizing a reset conductor common to all magnetic cores. Still further, since the changes in flux state of a magnetic core are substantially instantaneous, print information may be written in and read out of the temporary storage of the present invention at an extremely high rate—easily within the one millisecond requirement of present day high speed printers.

As indicated in FIGURE 3, the storage arrangement of the present invention is particularly adapted to use in a lister type of high speed printer. In such printer arrangements, each column conductor of the core array may be associated with a particular tape unit of the tape selector 56 while each row conductor is associated with a particular print column of each of the print tapes. Accordingly, in such a printer arrangement, energizing of a particular row and column conductor defines a particular print column of a print tape which is to be printed.

Figure 4:
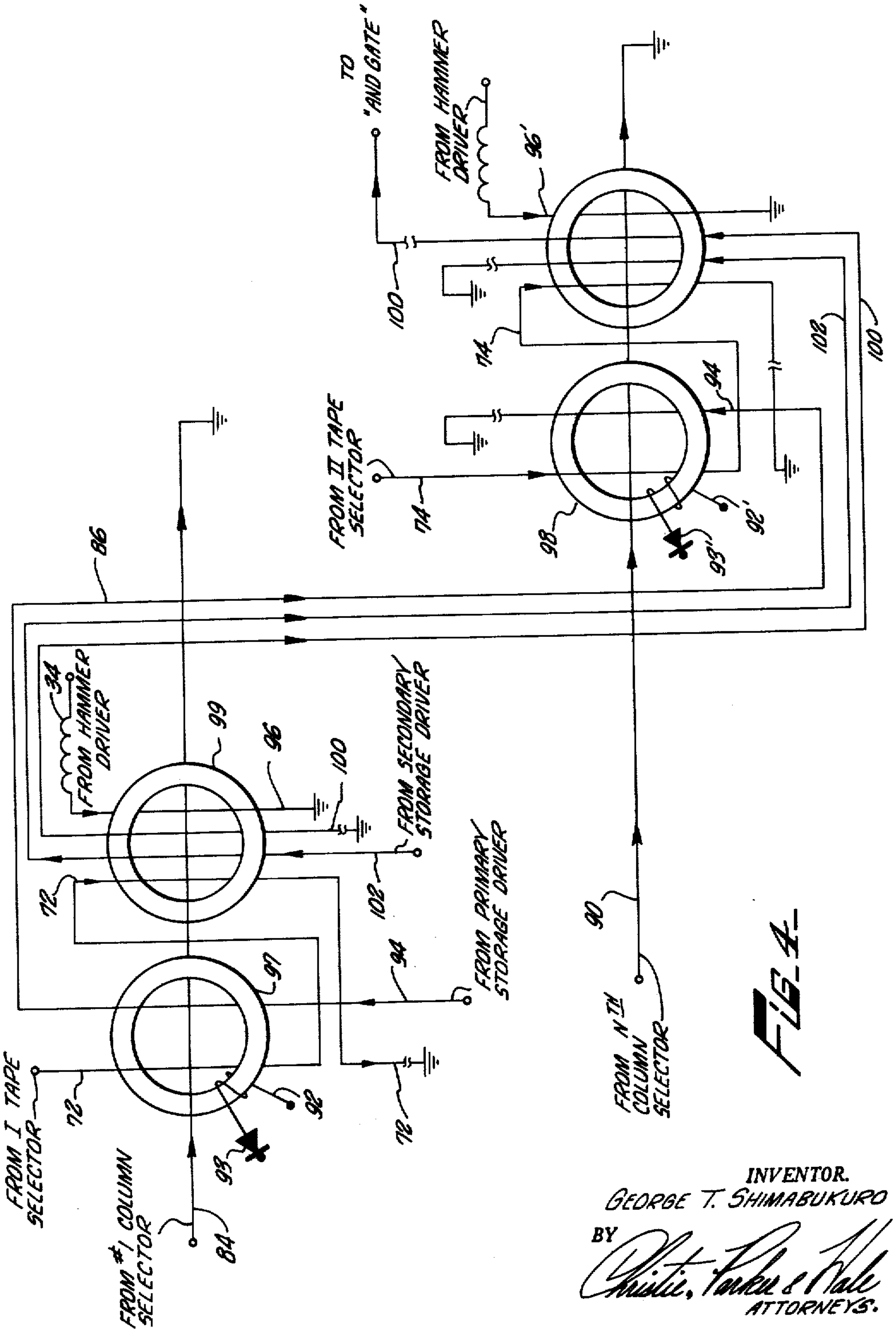
FIGURE 4 is a diagrammatic representation of the print checking configuration of the present invention.

Referring to FIGURE 4, there is represented a novel print checking arrangement of the present invention. In particular, the print checking arrangement is illustrated in connection with magnetic cores 97 and 98, these cores being associated with the column conductors 72 and 74 and the row conductors 84 and 90, respectively, of the array of cores shown in FIGURE 3. As illustrated, the print checking arrangement includes a plurality of secondary cores each having a substantially rectangular hysteresis characteristic. As further illustrated, one secondary core is associated with each core of the row-column array represented in FIGURE 3, the cores of the row-column array being termed primary cores. In particular, as represented in FIGURE 4, each primary and secondary core is arranged to form a core pair, the row and column conductors associated with each primary core also passing through the associated secondary core. Accordingly, when a primary core is set to a predetermined flux state, as described in connection with FIGURE 3, the associated secondary core is also set to the same state.

To provide means for checking the actuation of the print hammers in response to the resetting of the previously set primary cores, each print hammer includes a conductor 96 connected to its associated actuate winding 34. As illustrated in FIGURE 4, a conductor 96 passes through the secondary core of each associated core pair. Thus, when a print hammer is actuated by a current signal passing through its associated actuate winding, the same current signal passes through the associated core pair to reset the secondary core.

To sense the reset of a secondary core, the print checking arrangement of the present invention includes a sensing conductor 100 coupled to the "and" gate 68 represented in FIGURE 1 and which passes in a like direction through all secondary cores. In particular, in response to a setting or resetting of a secondary core, a current signal is induced in the sensing conductor 100 and applied to one input of the "and" gate 68. However, since, as described in connection with FIGURE 1, the other input to the "and" gate 68 is coupled to the secondary storage driver 66, a current signal is passed by the "and" gate 68 only upon a coincidence of the current signal induced in the sensing conductor 100 and an energization of the storage driver 66.

As mentioned above, the actuation of a print hammer causes a reset of its associated secondary core. If, however, for some reason the reset of a previously set primary core does not result in a current passing through the actuate winding of an associated print hammer, the print hammer is not actuated thereby producing a printing error. When this occurs no current signal passes through the associated conductor 96 to reset the secondary core. Thus the secondary core remains in a set condition which is indicative of a printing error.

To detect such a printing error, the print checking arrangement of the present invention includes a secondary reset conductor 102 which is connected to the secondary storage driver 62 illustrated in FIGURE 1 and passes in a like direction through all secondary cores. As briefly described in connection with FIGURE 1, in response to the operation of the photocell 52 (which follows each actuation of the print hammers), the secondary storage driver 66 excites a reset current. In particular, as represented in FIGURE 4, the reset current passes via the reset conductor 102 to all secondary cores to reset all previously set secondary cores. If a one of the secondary cores remains in a set condition after the hammers have been actuated, the reset current resets that secondary core. This produces an output current in the sensing conductor 100 which is applied to the "and" gate 86. Since the output of the secondary storage driver 66 is also applied to the "and" gate 68, the "and" gate 68 operates. With the "and" gate 68 operated, a current signal is transmitted to the auxiliary hammer driver 70 represented in FIGURE 1 to actuate the auxiliary print hammer 26, thereby indicating the particular letter which was not actuated.

Accordingly, by the novel combination of a secondary core with each primary core of the row-column array of magnetic cores, means are provided for selectively indicating printing errors which may occur in a high speed printer.

I claim:

1. In a high speed printer which includes a plurality of print hammers, a print-information storage arrangement comprising: a plurality of magnetic cores having a substantially rectangular hysteresis characteristic and arranged in a row-column array, each core being associated with a particular print hammer; means for independently setting each magnetic core in response to print information including a plurality of column conductors one associated with each column of cores and passing through each core of its associated column, a plurality of row conductors one associated with each row and passing through each core of its associated row, and means for selectively energizing particular row and column conductors; a plurality of output windings one wound around each magnetic core; means including a reset conductor passing through all magnetic cores for simultaneously resetting all magnetic cores to produce an output current in the output winding of each previously set magnetic core to actuate particular print hammers; and means coupled to each output winding for prohibiting the actuation of the print hammers upon a setting of the magnetic cores.

2. In a high-speed printer which includes a plurality of print hammers, a print-information storage arrangement comprising: a plurality of magnetic cores of magnetic material having a rectangular hysteresis characteristic, one magnetic core being associated with each print hammer; means including a pair of current conductors passing through each core for independently setting each magnetic core in response to print information; and means including a single current conductor passing through the plurality of magnetic cores for simultaneously resetting all previously set magnetic cores to actuate particular print hammers.

3. In a high-speed printer which includes a plurality of print hammers, the combination of: a plurality of magnetic cores having a substantially rectangular hysteresis characteristic, one associated with each print hammer; a plurality of output windings, one wound around each magnetic core; a plurality of unidirectional current conductive devices, one coupled to each output winding; a plurality of hammer-driving means, one coupled in series between each print hammer and a unidirectional current conductive device; selector means for selectively energizing particular cores to select particular print hammers to be actuated, said selector means including means for simultaneously passing two current signals in a like direction through each of the particular magnetic cores to set the particular cores to a predetermined flux state; and actuator means for simultaneously energizing the selected print hammers, said actuator means including means for passing a reset current through each magnetic core in a direction opposite to that of said two current signals.

4. In a high-speed printer which includes a plurality of print hammers, the combination of: a plurality of magnetic cores having a substantially rectangular hysteresis characteristic arranged in a row-column array, each core being associated with a particular print hammer; a plurality of output windings one wound around each core; a plurality of diodes, one coupled to each output winding; a plurality of hammer-driving means, one coupled in series between each print hammer and a diode; a plurality of column conductors, one associated with each column of cores and passing through each core of its associated column; a plurality of row conductors, one associated with each row of cores and passing through each core of its associated row; a reset conductor passing through all magentic cores; means for storing print-information in the core array including means for selectively energizing particular rows and column conductors to set all magnetic cores common with an energized row and an energized column conductor to a predetermined flux state; and means for simultaneously actuating the particular hammers which correspond to the print information stored in the core array including means for exciting said reset conductor to reset all previously set magnetic cores.

5. Means for checking the actuation of a print hammer driven in response to the reset of a primary magnetic core having a rectangular hysteresis characteristic, compressing: a secondary magnetic core having a rectangular hysteresis characteristic; means for setting said secondary magnetic core with said primary magnetic core; means for resetting said secondary magnetic core from an actuation of the print hammer associated with the primary magnetic core; means for passing a current through said secondary magnetic core to reset said secondary core; means for sensing the reset of said secondary core to produce an output signal; and means responsive to a coincidence of said output signal and said reset current for indicating a printing error.

6. In a high-speed printer which includes a plurality of print hammers, a print-information storage arrangement comprising: a plurality of magnetic core pairs each core of which has a substantially rectangular hysteresis characteristic, one core pair being associated with each print hammer; means including a pair of current conductors passing through each core of each core pair for independently setting each core pair in response to print information; means including a single current conductor passing through the first core of each core pair for simultaneously resetting the first core of each core pair to actuate particular print hammers associated with previously set magnetic core pairs; means responsive to an actuation of a print hammer for resetting a second core of an associated core pair; means for sensing a reset of each second core to produce an output signal; means for applying a reset current to each of said second cores to produce an output signal for all second cores which are in a set condition; and means responsive to a coincidence of said output signal and said reset current for indicating a printing error.

7. In a high speed printer which includes a plurality of print hammers, a print-information storage arrangement comprising: a plurality of magnetic core pairs each having first and second cores of material which has a rectangular hysteresis characteristic arranged in a row-column array, each core pair being associated with a particular print hammer; means for independently setting each core pair in reponse to print information including a plurality of column conductors one associated with each column of core pairs and passing through each core of its associated column and a plurality of row conductors one associated with each row of core pairs and passing through each core of its associated row; a plurality of output windings one wound around the first core of each core pair; means for inhibiting current signals induced in said output windings in response to a setting of associated magnetic cores; means for simultaneously resetting the first core of all core pairs to produce an output signal in the output winding of all previously set first cores to actuate particular print hammers, said means including a primary reset conductor passing through the first core of all core pairs; a plurality of conductors one passing through the second core of each core pair, each of said conductors being coupled to an associated print hammer to respond to the actuation of the print hammer to reset the second core of its associated core pair; a sensing conductor passing through the second core of all core pairs to provide an output signal when a second core is reset; means for resetting the second core of each core pair including a secondary reset conductor passing through the second core of all core pairs; an "and" gate coupled to said sensing conductor and said secondary reset conductor; and utilization means coupled to said "and" gate.

8. In a high-speed printer which includes a rotating type drum, a print medium positioned adjacent to the surface of the type drum, the print medium having a plurality of print columns, and a plurality of print hammers, one positioned adjacent to each print column, the combination of: a plurality of magnetic core pairs each having first and second cores of material having a substantially rectangular hysteresis characteristic arranged in a row-column array, each core pair being associated with a particular print hammer; a plurality of output windings one wound around the first core of each core pair; a plurality of unidirectional current conductive devices, one coupled to each output winding; a plurality of hammer-driving means, one coupled in series between each print hammer and a unidirectional current conductive device; a plurality of column conductors, one associated with each column of core pairs and passing through each core of its associated column; a plurality of row conductors, one associated with each row of core pairs and passing through each core of its associated row; a primary reset conductor passing through the first core of all core pairs; means for storing print-information in the core pair array including means for selectively energizing particular row and column conductors to set all magentic cores common with an energized row and an energized column conductor; means for simultaneously actuating the particular print hammers which correspond to the print information stored in the core pair array including means for exciting said primary reset conductor to reset the first core of each previously set core pair; a plurality of conductors, one passing through the second core of each core pair, said conductor being coupled to its associated print hammer to respond to the actuation of the print hammer to reset the second core of its associated core pair; a sensing conductor passing through the second core of all core pairs to provide an output signal when a second core is reset; a secondary reset conductor passing through the second core of all core pairs; means for exciting said secondary reset conductor to reset the second core of all core pairs; and means responsive to a coincidence of an excitation of said secondary reset conductor and an output signal for indicating a printing error.

References Cited in the file of this patent

UNITED STATES PATENTS

| | | |
|---|---|---|
| 2,666,151 | Rajchman et al. | Jan. 12, 1954 |
| 2,915,967 | Gehring et al. | Dec. 8, 1959 |
| 2,946,985 | McMillan et al. | July 26, 1960 |
| 2,964,737 | Christopherson | Dec. 13, 1960 |
| 2,978,977 | Eckert et al. | Apr. 11, 1961 |
| 3,001,469 | Davis et al. | Sept. 26, 1961 |
| 3,004,172 | Bader | Oct. 10, 1961 |

UNITED STATES PATENT OFFICE

CERTIFICATE OF CORRECTION

Patent No. 3,088,401

May 7, 1963

George T. Shimabukuro

It is hereby certified that error appears in the above numbered patent requiring correction and that the said Letters Patent should read as corrected below.

Column 2, line 21, for "cone" read -- core --; column 8, lines 65 and 66, for "compressing" read -- comprising --.

Signed and sealed this 31st day of December 1963.

(SEAL)
Attest:

ERNEST W. SWIDER

Attesting Officer

EDWIN L. REYNOLDS

Acting Commissioner of Patents